United States Patent
Brixius et al.

(10) Patent No.: US 7,048,109 B2
(45) Date of Patent: May 23, 2006

(54) TRANSPORT SYSTEM FOR CONTAINERS, IN PARTICULAR AN AIRPORT BAGGAGE HANDLING SYSTEM, AND INCLINE CONVEYOR FOR A TRANSPORT SYSTEM

(75) Inventors: Wolfgang Brixius, Neunkirchen A.Br (DE); Dominik Gräfer, Dortmund-Wellinghofen (DE); Albrecht Hoene, Lappersdorf (DE)

(73) Assignee: Siemens Aktiengesellschaft, München (DE)

( * ) Notice: Subject to any disclaimer, the term of this patent is extended or adjusted under 35 U.S.C. 154(b) by 166 days.

(21) Appl. No.: 10/841,952

(22) Filed: May 7, 2004

(65) Prior Publication Data

US 2004/0238332 A1 Dec. 2, 2004

(30) Foreign Application Priority Data

May 15, 2003 (DE) ................................ 103 21 915

(51) Int. Cl.
*B65G 17/00* (2006.01)
*B64F 1/32* (2006.01)

(52) U.S. Cl. ................................ 198/465.3; 198/468.6; 198/817

(58) Field of Classification Search ............. 198/463.3, 198/465.1, 465.2, 465.3, 468.6, 468.11, 604, 198/607, 728, 817, 867.13
See application file for complete search history.

(56) References Cited

U.S. PATENT DOCUMENTS

| 1,732,376 | A | * | 10/1929 | Olson ......................... 198/349 |
|---|---|---|---|---|
| 2,640,580 | A | | 6/1953 | De Burgh |
| 3,610,372 | A | * | 10/1971 | Warren ........................ 188/22 |
| 3,705,001 | A | * | 12/1972 | Lingg et al. ................. 198/611 |
| 3,753,485 | A | * | 8/1973 | Fromme et al. ............. 198/358 |
| 3,977,513 | A | | 8/1976 | Rushforth |
| 4,095,390 | A | * | 6/1978 | Knudsen .................... 53/329.4 |
| 4,175,656 | A | * | 11/1979 | Lang .......................... 198/748 |
| 4,722,430 | A | * | 2/1988 | Canziani ................ 198/370.04 |
| 5,570,773 | A | * | 11/1996 | Bonnet .................. 198/370.04 |
| 6,257,152 | B1 | * | 7/2001 | Liu ............................. 108/53.3 |
| 6,398,016 | B1 | * | 6/2002 | Maeder et al. ........ 198/867.13 |
| 6,494,308 | B1 | * | 12/2002 | Bonora et al. ............. 198/465.2 |
| 6,540,064 | B1 | | 4/2003 | Bodewes et al. |
| 6,910,570 | B1 | * | 6/2005 | Brixius et al. ........... 198/463.3 |
| 6,942,088 | B1 | * | 9/2005 | Reiners ................... 198/465.1 |

FOREIGN PATENT DOCUMENTS

EP    0 802 129 A2    10/1997
EP    1 094 018 A1    4/2001

* cited by examiner

*Primary Examiner*—Douglas Hess
(74) *Attorney, Agent, or Firm*—Henry M. Feiereisen

(57) ABSTRACT

A transport system, in particular an airport baggage handling system, includes a container having an underside formed with a grooved recess which defines a leading edge and a trailing edge, as viewed in a transport direction of the container. The transport system has at least one incline conveyor which is constructed to define a convexly curved transport path for transporting the container through engagement of the grooved recess, whereby the incline conveyor supports only the leading and trailing edges of the recess of the container, as the container is moved in the transport direction. This ensures a stable travel of the container along the convexly curved transport path.

14 Claims, 4 Drawing Sheets

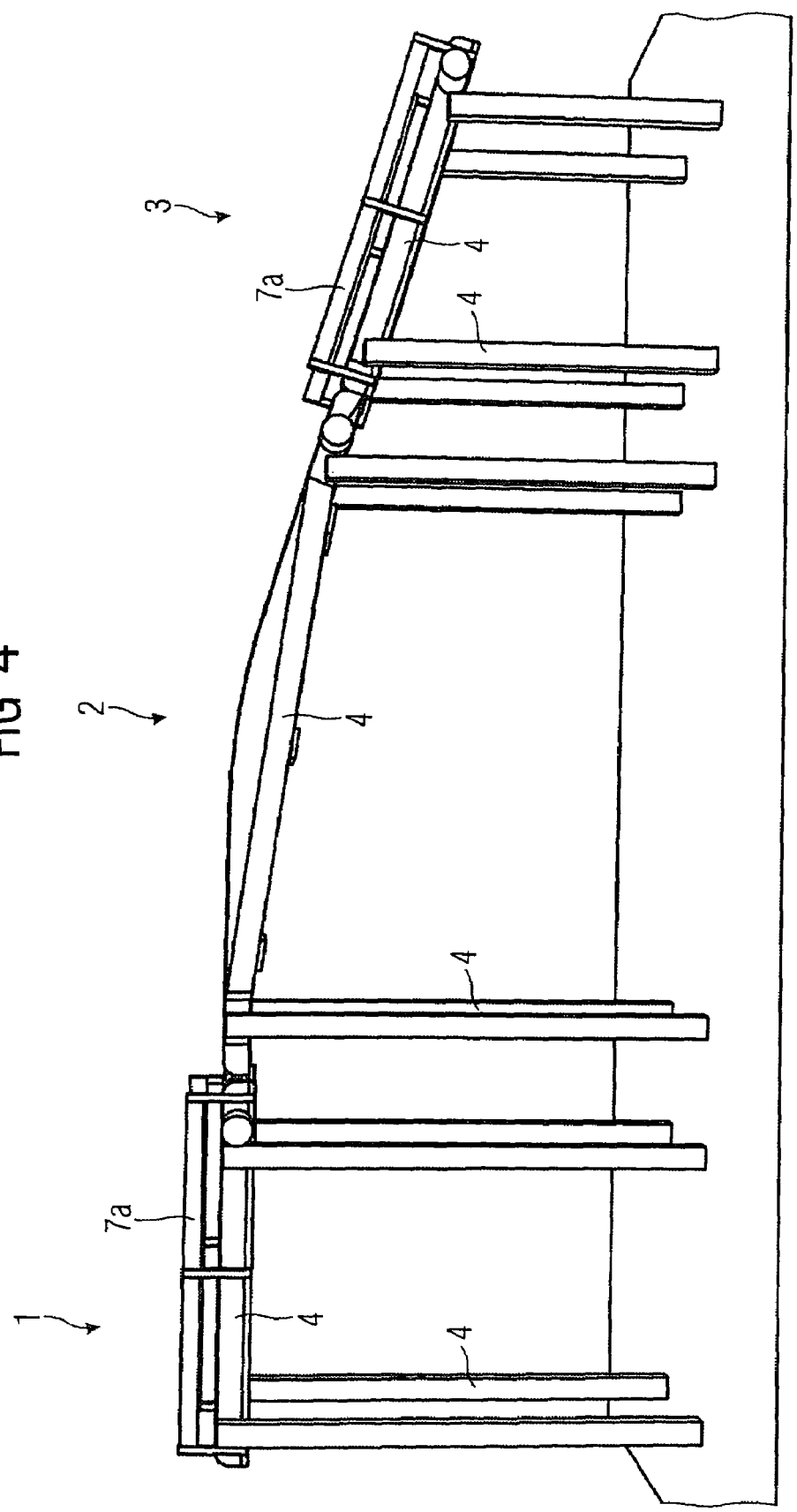

TRANSPORT SYSTEM FOR CONTAINERS, IN PARTICULAR AN AIRPORT BAGGAGE HANDLING SYSTEM, AND INCLINE CONVEYOR FOR A TRANSPORT SYSTEM

CROSS-REFERENCES TO RELATED APPLICATIONS

This application claims the priority of German Patent Application, Serial No. 103 21 915.3, filed May 15, 2003, pursuant to 35 U.S.C. 119(a)–(d), the disclosure of which is incorporated herein by reference.

BACKGROUND OF THE INVENTION

The present invention relates, in general, to a transport system for containers, in particular an airport baggage handling system, and incline conveyor for a transport system.

Transport systems for containers, in particular airport baggage handling systems, are known to have conveyors that move containers between various elevations. The conveyors normally include driving belts or bands for support and transport of the container. Oftentimes, the conveyors are constructed to emulate a convexly curved transport path by disposing a series of straight conveyor elements which are so lined up as to resemble the convex transport path. The term "convexly curved" relates hereby to configuration which is curved outwards in relation to the container underside. Conventional transport systems of this type have the drawback of an uncontrolled transport of containers because the containers frequently assume an instable position, as they advance along the convexly curved transport path.

It would therefore be desirable and advantageous to provide an improved transport system to obviate prior art shortcomings.

SUMMARY OF THE INVENTION

According to one aspect of the present invention, a transport system, in particular an airport baggage handling system, includes a container having an underside formed with a grooved recess which defines a leading edge and a trailing edge, as viewed in a transport direction of the container, and an incline conveyor constructed to define a convexly curved transport path for transporting the container through engagement of the grooved recess, whereby the incline conveyor supports only the leading and trailing edges of the recess of the container, as the container is moved in the transport direction.

The present invention resolves prior art problems by providing a groove-shaped recess in the bottom underside of the container for engagement by the incline conveyor from underneath as the container travels along the convexly curved transport path, whereby the incline conveyor supports only the leading and trailing edges of the recess of the container. Since only two edges of the container are supported by the incline conveyor during its passage, a stable disposition of the container is ensured in all situations. This is further promoted by a sufficient depth of the recess which is so dimensioned that the incline conveyor is able to project into the recess during passage of the container, without touching the bottom of the recess.

According to another feature of the present invention, the incline conveyor may include a revolving conveyor belt as driving unit for moving the container.

According to another feature of the present invention, the incline conveyor may include a guide element for guiding the conveyor belt, with the guide element being configured to complement the convexly curved transport path. In this way, the convexly curved transport path can easily be imitated by the conveyor belt. A lateral guidance of the container can be enhanced through interaction between the guide element and opposite sidewalls of the recess. In a simple configuration, the guide element may be constructed as a plate of a thickness to correspond to a distance between the sidewalls. In this way, a quasi lateral form-fitting engagement with the recess is realized.

According to another feature of the present invention, the container may include two such recesses which are rectangular in cross section and have longitudinal sides in parallel relationship for engagement of two guide elements, respectively, which extend in parallel relationship.

According to another aspect of the present invention, an incline conveyor of a transport system for container, in particular an airport baggage handling system, includes a conveyor section constructed to define a convexly curved transport path for transporting a container through engagement of a grooved recess formed in an underside of the container and defining a leading edge and a trailing edge, as viewed in transport direction, with the conveyor section engaging only the leading and trailing edges of the container, as the container is moved in the transport direction.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 4 is a side view of the transport system of FIG. 1.

DETAILED DESCRIPTION OF PREFERRED EMBODIMENTS

Figure 1:
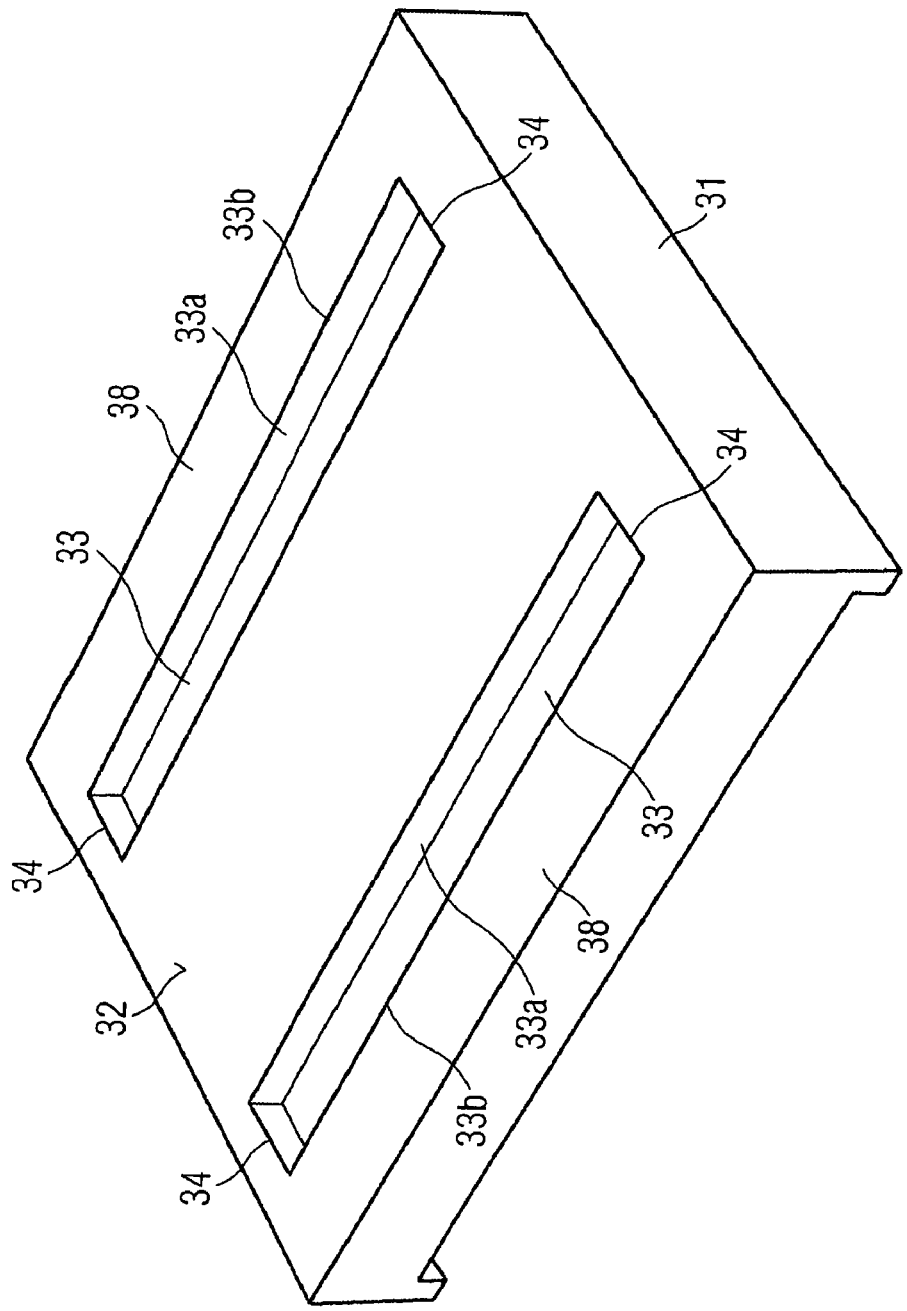
FIG. 1 is a bottom perspective view of a container for use in a transport system according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

This is one of two applications both filed on the same day. Both applications deal with related inventions. They are commonly owned and have the same inventive entity. Both applications are unique, but incorporate the other by reference. Accordingly, the following U.S. patent application is hereby expressly incorporated by reference: "TRANSPORT SYSTEM FOR CONTAINERS, IN PARTICULAR AN AIRPORT BAGGAGE HANDLING SYSTEM".

Turning now to the drawing, and in particular to FIG. 1, there is shown a bottom perspective view of a container, generally designated by reference numeral 31, for use in a transport system according to the present invention. The container 31 has a flat bottom underside 32 having formed therein two groove-shaped recesses 33 which are rectangular in cross section. The recesses 33 have longitudinal sides 33b in parallel relationship and are each bounded by parallel sidewalls 33a. As viewed in transport direction of the container 31, the recesses 33 define leading and trailing end edges 34 which together with lateral bottom surfaces 38 are used for transport of the container 31.

Figure 2:
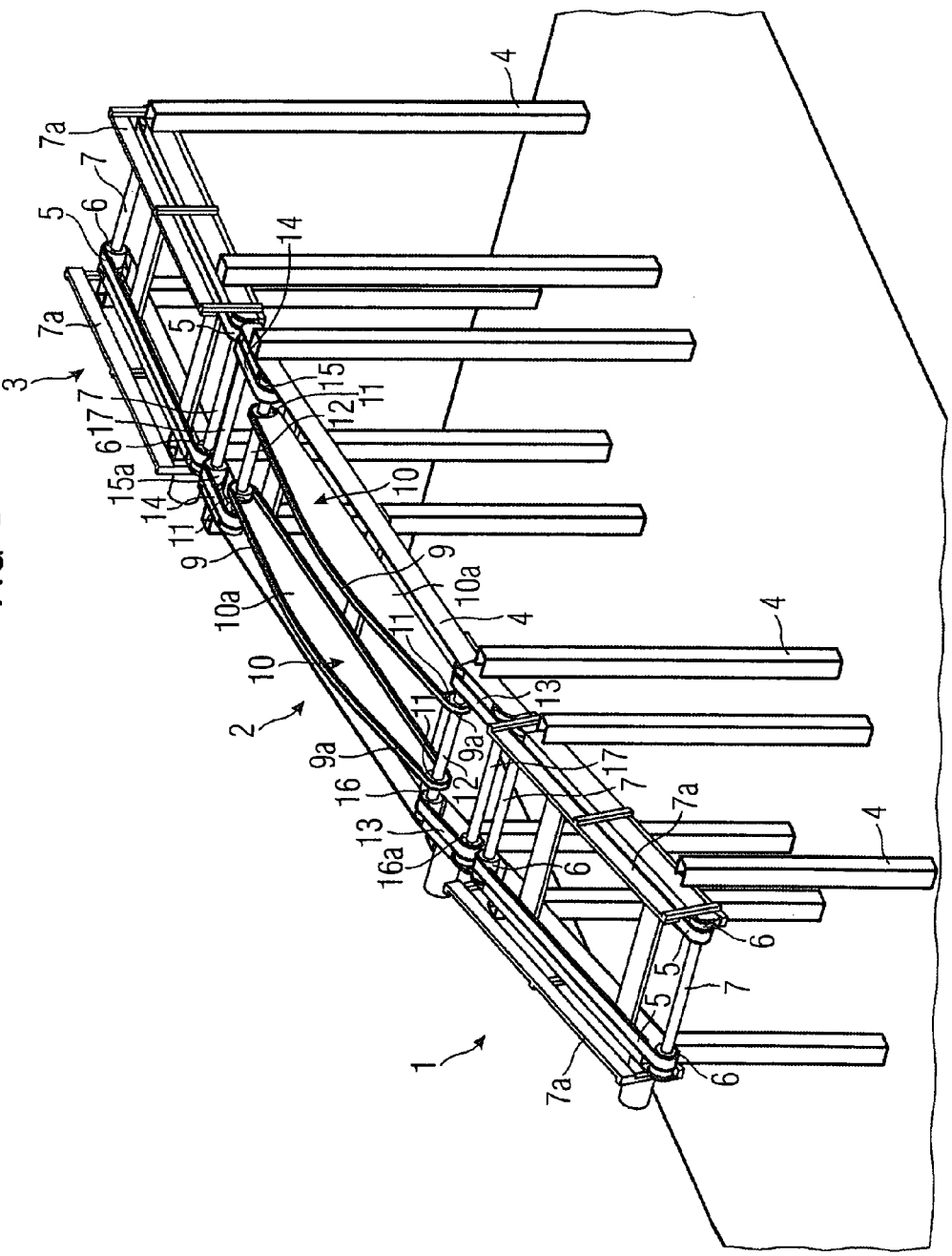
FIG. 2 is a top perspective illustration of a portion of a transport system including an incline conveyor to provide a convexly curved transport path, in accordance with the present invention.

FIG. 2 shows a top perspective illustration of a transport portion of the transport system for containers 31. As viewed in transport direction of the containers 31, the transport system includes a linear incline, generally designated by reference numeral 1, a convexly curved incline conveyor, generally designated by reference numeral 2 and placed downstream of the linear incline 1, and a horizontal transport member, generally designated by reference numeral 3 and placed downstream of the convexly curved incline conveyor 2.

The linear incline 1 includes a supporting structure 4 for placement on the ground and has two conveyor belts 5 in parallel relationship for moving the containers 31 from the bottom left-hand side to the upper right-hand side in FIG. 2. The conveyor belts 5 are continuously revolving conveyor belts which are looped around belt-reversing rollers 6, respectively mounted in pairs on two rotatably supported shafts 7. In this way, a synchronous travel of the conveyor belts 5 is ensured. The containers 31 are placed during their travel along the linear incline 1 with their flat bottom surfaces 38 upon the conveyor belts 5. Lateral boards 7a are further mounted on both sides to the supporting structure 4 for providing a lateral guidance of the containers 31 during their transport.

Figure 3:
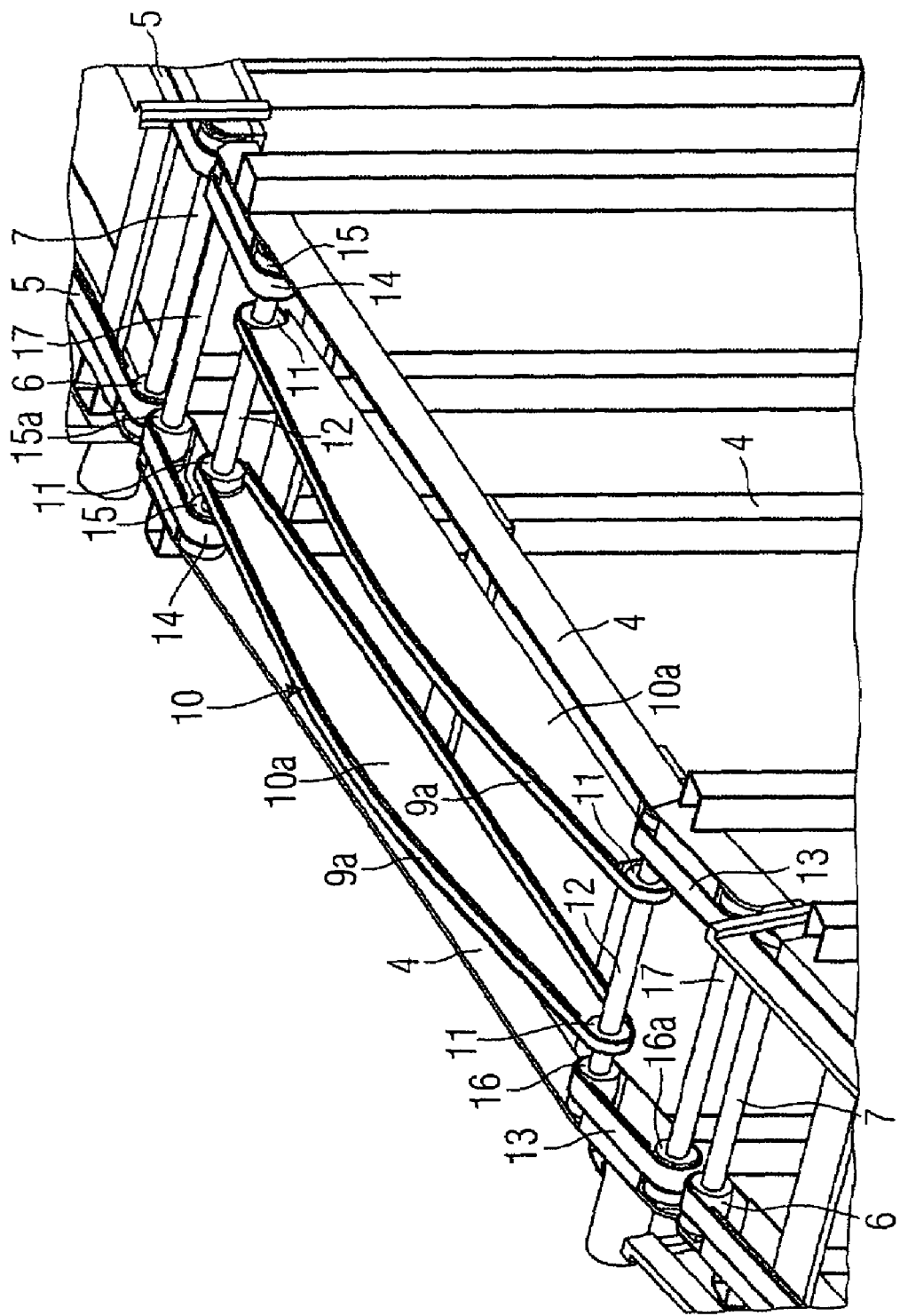
FIG. 3 is a detailed perspective view, on an enlarged scale, of a mid-section of the incline conveyor.

In mid-section, shown in particular in FIG. 3, the transport system includes the convexly curved incline conveyor 2 which is also mounted to the supporting structure 4 and includes a driving unit 9 in the form of continuously revolving conveyor belts 9a as driving members for moving the containers 31. The conveyor belts 9a are each wrapped around a guide element 10 in the form of a plate 10a which, as shown in FIG. 2 has an upper side which is vertically convexly curved and defines a linear entry zone and linear exit zone. The conveyor belts 9a are also looped around belt-reversing rollers 11 which are mounted in pairs on a common shaft 12, respectively.

Positioned upstream of the guide elements 10 are two straight parallel revolving conveyor belts 13 which are looped around belt-reversing rollers 16, 16a, with one pair of the belt-reversing rollers 16 mounted on the adjacent shaft 12 and the other pair of belt-reversing rollers 16a mounted on a shaft 17. Likewise, positioned downstream of the guide elements 10 are two straight parallel revolving conveyor belts 14 which are looped around belt-reversing rollers 15, 15a, with one pair of the belt-reversing rollers 15 mounted on the adjacent shaft 12 and the other pair of belt-reversing rollers 16a mounted on a shaft 17. In this way, the conveyor belts 9, 13 and 14 operate in synchronism.

The horizontal transport member 3 is constructed substantially in correspondence to the linear incline 1 and includes two parallel conveyor belts 5 which are bounded to the outside by side boards 7a. The conveyor belts 5 are looped about pairs of belt-reversing rollers 6 mounted onto rotatably supported shafts 7.

FIG. 4 shows also by way of a side view of the transport system the relationship between the linear incline 1, the convexly curved incline conveyor 2, and the horizontal transport member 3.

During travel of the container 31 along the convexly curved incline conveyor 2, the conveyor belts 9a, including the guide elements 10, engage from underneath into the recesses 33 of the containers 31, whereby the containers 31 touch the convex transport path of the conveyor belts 9a only with their leading and trailing edges 34. The guide elements 10 interact hereby with the sidewalls 33a of the recesses 33 for lateral guidance of the containers 31, whereby the thickness of the plate-shaped guide elements 10 correspond to the distance between the sidewalls 33a. Although the provision of two recesses 33 in the container 31 is a presently preferred configuration, as it results in a reliable guidance of the containers 31, the present invention should not be limited thereto. For example, it is conceivable to provide the container with only one recess for engagement by one conveyor belt.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A transport system, in particular an airport baggage handling system, comprising:
   a container having an underside formed with a grooved recess which defines a leading edge and a trailing edge, as viewed in a transport direction of the container, and
   an incline conveyor constructed to define a convexly curved transport path for transporting the container through engagement of the grooved recess, whereby the incline conveyor supports only the leading and trailing edges of the recess of the container, as the container is moved in the transport direction.

2. The transport system of claim 1, wherein the incline conveyor includes a revolving conveyor belt for moving the container.

3. The transport system of claim 2, wherein the conveyor belt is looped about spaced-apart belt reversing rollers, with one of the rollers mounted on a first shaft and with the other one of the rollers mounted on a second shaft, and further comprising a first straight conveyor placed upstream of the incline conveyor and including a conveyor belt looped about spaced-apart belt-reversing rollers, with one of the rollers mounted on the first shaft, and a second straight conveyor placed downstream of the incline conveyor and including a conveyor belt looped about spaced-apart belt-reversing rollers, with one of the rollers mounted on the second shaft.

4. The transport system of claim 1, wherein the incline conveyor includes a guide element for guiding the conveyor belt, said guide element being configured to complement the convexly curved transport path.

5. The transport system of claim 4, wherein the guide element interacts with opposite sidewalls of the recess for guiding the container.

6. The transport system of claim 5, wherein the guide element is constructed as a plate of a thickness to correspond to a distance between the sidewalls.

7. The transport system of claim 4, wherein the container includes two of said recesses, with each recess being rectangular in cross section and having longitudinal sides in parallel relationship, each said recess constructed for engagement of one of said guide element, with the guide element for engagement in one recess and the guide element for engagement in the other recess extending in parallel relationship.

8. An incline conveyor of a transport system for container, in particular an airport baggage handling system, comprising a conveyor section constructed to define a convexly curved transport path for transporting a container through engagement of a grooved recess formed in an underside of the container and defining a leading edge and a trailing edge, as viewed in transport direction, with the conveyor section engaging only the leading and trailing edges of the container, as the container is moved in the transport direction.

9. The incline conveyor of claim 8, wherein the conveyor section includes a revolving conveyor belt for moving the container.

10. The incline conveyor of claim 9, wherein the conveyor belt is looped about spaced-apart belt reversing rollers, with one of the rollers mounted on a first shaft and with the other one of the rollers mounted on a second shaft, and further comprising a first straight conveyor placed upstream of the conveyor section and including a conveyor belt looped about spaced-apart belt-reversing rollers, with one of the rollers mounted on the first shaft, and a second straight conveyor placed downstream of the conveyor section and including a conveyor belt looped about spaced-apart belt-reversing rollers, with one of the rollers mounted on the second shaft.

11. The incline conveyor of claim 8, wherein the conveyor section includes a guide element for guiding the conveyor belt, said guide element being configured to complement the convexly curved transport path.

12. The incline conveyor of claim 11, wherein the guide element interacts with opposite sidewalls of the recess for guiding the container.

13. The incline conveyor of claim 12, wherein the guide element is constructed as a plate of a thickness to correspond to a distance between the sidewalls.

14. The incline conveyor of claim 11, wherein the container includes two of said recesses, with each recess being rectangular in cross section and having longitudinal sides in parallel relationship, each said recess constructed for engagement of one of said guide element, with the guide element for engagement in one recess and the guide element for engagement in the other recess extending in parallel relationship.

* * * * *